(12) United States Patent
Park et al.

(10) Patent No.: US 11,316,546 B2
(45) Date of Patent: Apr. 26, 2022

(54) METHOD FOR DATA TRANSMISSION USING CARRIER AGGREGATION, AND ELECTRONIC DEVICE THEREFOR

(71) Applicant: Samsung Electronics Co., Ltd., Gyeonggi-do (KR)

(72) Inventors: Jung-Min Park, Gyeonggi-do (KR); Hyunsoo Kim, Seoul (KR)

(73) Assignee: Samsung Electronics Co., Ltd

( * ) Notice: Subject to any disclaimer, the term of this patent is extended or adjusted under 35 U.S.C. 154(b) by 3 days.

(21) Appl. No.: 16/757,113

(22) PCT Filed: Oct. 17, 2018

(86) PCT No.: PCT/KR2018/012256
§ 371 (c)(1),
(2) Date: Apr. 17, 2020

(87) PCT Pub. No.: WO2019/078613
PCT Pub. Date: Apr. 25, 2019

(65) Prior Publication Data
US 2020/0244292 A1 Jul. 30, 2020

(30) Foreign Application Priority Data

Oct. 18, 2017 (KR) .......................... 10-2017-0135174

(51) Int. Cl.
*H04L 5/00* (2006.01)
*H04B 1/04* (2006.01)
(Continued)

(52) U.S. Cl.
CPC .......... *H04B 1/0458* (2013.01); *H04B 7/0486* (2013.01); *H04B 17/309* (2015.01); *H04B 2001/0416* (2013.01)

(58) Field of Classification Search
CPC ...... H04B 1/0064; H04B 1/04; H04B 1/0458; H04B 7/0413; H04B 7/0486;
(Continued)

(56) References Cited

U.S. PATENT DOCUMENTS 8,717,992 B2 * 5/2014 Hamaguchi ......... H04W 52/146
370/329
8,880,096 B2 11/2014 Rousu et al.
(Continued)

FOREIGN PATENT DOCUMENTS

KR 1020110084969 7/2011
KR 1020110136835 12/2011
(Continued)

OTHER PUBLICATIONS

PCT/ISA/210 Search Report dated Jan. 22, 2019 issued on PCT/KR2018/012256, pp. 5.
(Continued)

*Primary Examiner* — Frank Duong
(74) *Attorney, Agent, or Firm* — The Farrell Law Firm, P.C.

(57) ABSTRACT

Various embodiments of the present disclosure relate to an apparatus and a method for data transmission using carrier aggregation (CA) in an electronic device. An operating method of an electronic device according to various embodiments of the present disclosure includes: determining a frequency band based on information regarding at least one of a rank or a service, which is applied to frequency bands used for CA; performing impedance matching with reference to the frequency band; and transmitting data by using antennas for which the impedance matching has been performed. Other embodiments are possible.

17 Claims, 11 Drawing Sheets

(51) Int. Cl.
*H04B 17/309* (2015.01)
*H04B 7/0456* (2017.01)

(58) Field of Classification Search
CPC .......... H04B 17/309; H04B 2001/0416; H04B 2203/5425; H04L 5/0035; H04L 25/0278; H04W 36/0055; H04W 36/0069
See application file for complete search history.

(56) References Cited

U.S. PATENT DOCUMENTS

| | | | |
|---|---|---|---|
| 9,337,539 B1* | 5/2016 | Ananthanarayanan | ...................... H01Q 5/335 |
| 9,337,990 B2* | 5/2016 | Narahashi | ............. H04L 5/1461 |
| 9,357,442 B2* | 5/2016 | Lim | .................. H04W 36/0022 |
| 9,553,619 B2* | 1/2017 | Domino | ............. H04B 1/0483 |
| 9,554,359 B2* | 1/2017 | Tabet | ....................... H04L 25/00 |
| 10,666,300 B2* | 5/2020 | Wloczysiak | ......... H04B 1/0017 |
| 2009/0097583 A1 | 4/2009 | Shin et al. | |
| 2010/0113078 A1 | 5/2010 | Farajidana et al. | |
| 2010/0254474 A1 | 10/2010 | Gomadam et al. | |
| 2012/0063398 A1 | 3/2012 | Hamaguchi et al. | |
| 2012/0094708 A1 | 4/2012 | Park et al. | |
| 2013/0016767 A1 | 1/2013 | Pean et al. | |
| 2015/0105120 A1 | 4/2015 | Lim | |
| 2015/0305035 A1* | 10/2015 | Hu | ....................... H04B 1/0458 370/329 |
| 2016/0065255 A1 | 3/2016 | Domino | |
| 2017/0272108 A1* | 9/2017 | Filipovic | ............. H04B 7/0619 |

FOREIGN PATENT DOCUMENTS

| | | |
|---|---|---|
| KR | 1020120007171 | 1/2012 |
| KR | 1020120038152 | 4/2012 |
| KR | 1020150043165 | 4/2015 |
| KR | 1020170024342 | 3/2017 |
| KR | 1020170048434 | 5/2017 |
| WO | WO 2015/092946 | 6/2015 |

OTHER PUBLICATIONS

PCT/ISA/237 Written Opinion dated Jan. 22, 2019 issued on PCT/KR2018/012256, pp. 6.
KR Notice of Patent Grant dated Nov. 16, 2021 issued in counterpart application No. 10-2017-0135174, 3 pages.
Korean Office Action dated Jun. 10, 2021 issued in counterpart application No. 10-2017-0135174, 12 pages.

* cited by examiner

METHOD FOR DATA TRANSMISSION USING CARRIER AGGREGATION, AND ELECTRONIC DEVICE THEREFOR

PRIORITY

This application is a National Phase Entry of PCT International Application No. PCT/KR2018/012256, which was filed on Oct. 17, 2018, and claims priority to Korean Patent Application No. 10-2017-0135174, which was filed on Oct. 18, 2017, the content of each of which are incorporated herein by reference.

TECHNICAL FIELD

Various embodiments of the present disclosure relate to an apparatus and a method for data transmission using carrier aggregation (CA) in an electronic device.

BACKGROUND ART

To satisfy the demand for wireless data traffic, which has increasingly been being used since commercialization of 4th generation (4G) communication systems, efforts to develop enhanced 5th generation (5G) communication systems or pre-5G communication system are ongoing. To achieve a high data transmission rate in the 5G system, various transmission methods are being discussed. For example, in a network environment supporting carrier aggregation (CA) and multi input multi output (MIMO), an electronic device may enhance data transmission performance by selecting and adjusting a frequency band for transmitting data.

DISCLOSURE OF INVENTION

Technical Problem

When an electronic device transmits data by using carrier aggregation (CA), a frequency band used in CA may include a primary carrier component (PCC) and at least one secondary carrier cell (SCC). In this case, if impedance only for a frequency domain corresponding to the PCC is adjusted, there may be a problem that a maximum amount of data cannot be transmitted since the MIMO environment of the SCC is not considered.

In addition, if impendence for a frequency domain is adjusted without considering a bandwidth of a frequency band used in CA and a priority of a service used by a user, a high throughput and a high bandwidth may not be guaranteed, and also, there may be a problem that impedance is not adaptively adjusted according to a service using state of the user.

Various embodiments of the present disclosure provide an apparatus and a method for data transmission using CA in an electronic device.

According to various embodiments of the present disclosure, an operating method of an electronic device includes: determining a frequency band based on information regarding at least one of a rank or a service, which is applied to frequency bands used for CA; performing impedance matching with reference to the frequency band; and transmitting data by using antennas for which the impedance matching has been performed.

According to various embodiments of the present disclosure, an electronic device includes: a communication module; at least one processor; and a memory operatively connected with the processor, and, when being executed, the memory stores instructions that cause the at least one processor to: determine a frequency band based on information regarding at least one of a rank or a service, which is applied to frequency bands used for CA; perform impedance matching with reference to the frequency band; and transmit data by using antennas for which the impedance matching has been performed.

According to various embodiments of the present disclosure, an operating method of an electronic device includes: identifying context information related to a signal of the electronic device; determining a frequency band based on the context information; performing impedance matching based on the frequency band; and transmitting the signal by using at least one antenna for which the impedance matching has been performed.

According to various embodiments of the present disclosure, an electronic device includes: a plurality of antennas configured to transmit a signal; and a processor, and the processor is configured to: identify context information related to the signal of the electronic device; determine a frequency band based on the context information; perform impedance matching based on the frequency band; and transmit the signal by using at least one antenna for which the impedance matching has been performed.

According to various embodiments of the present disclosure, a non-transitory computer readable medium includes a plurality of instructions, and, when the plurality of instructions are executed by a processor, the instructions are set to cause the processor to: determine a frequency band based on information regarding at least one of a rank or a service, which is applied to frequency bands used for CA; perform impedance matching with reference to the frequency band; and transmit data by using antennas for which the impedance matching has been performed.

Advantageous Effects of Invention

The electronic device and a method of operating the same according to various embodiments of the present disclosure may use impedance matching in a network environment using carrier aggregation (CA). Therefore, downlink or uplink performance may be further improved.

BEST MODE FOR CARRYING OUT THE INVENTION

Figure 1:
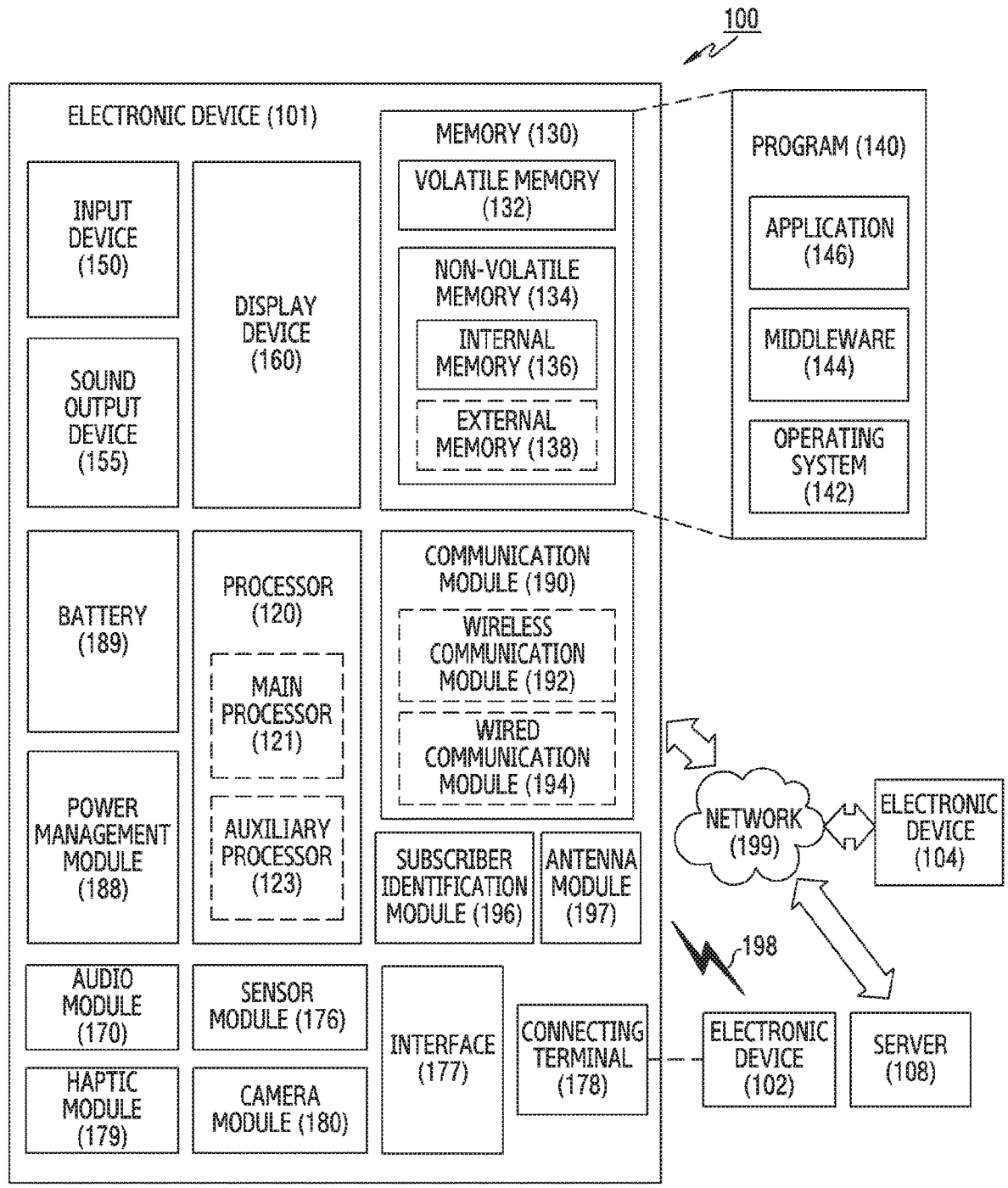
FIG. 1 is a block diagram illustrating an electronic device in a network environment according to various embodiments of the present disclosure.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ or PlayStation™), an electronic dictionary, an electronic key, a camcorder, or an electronic picture frame.

Another various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology. The term "user" used herein may refer to a person who uses an electronic device or may refer to a device (e.g., an artificial intelligence electronic device) that uses an electronic device.

The external device according to various embodiments of the application may include another electronic device configured to be the same as the electronic device or a vehicle control device for controlling the vehicle.

FIG. 1 is a block diagram illustrating an electronic device 101 in a network environment 100 according to various embodiments;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may include at least one antenna capable of transmitting and receiving signals or power with an external of the electronic device 101. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory #38) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Recent wireless communication environments require 16 download categories having a speed of 1 Gbps. However, since this requirement may be difficult to satisfy by 4×4 MIMO having a single frequency band, various data transmission techniques may be considered. For example, to overcome the limitation of speed by the single frequency band, an electronic device may transmit data by using CA. In a related-art single frequency band environment, an electronic device may minimize an antenna imbalance or maximize a total isotropic sensitivity (TIS) by adjusting impedance of an antenna with reference to the single frequency band. In various embodiments, when data is transmitted using CA, an electronic device may minimize an antenna imbalance and maximize a TIS by adjusting antenna impedance with reference to a frequency band of a primary cell (Pcell) including a transmission frequency. In another embodiment, when CA including 4×4 MIMO cells is used, an electronic device may not adjust impedance of an antenna with reference to a frequency band of a Pcell, and may determine a frequency band by considering 4×4 MIMO or a bandwidth (BW), and then may increase a data throughput to the maximum by adjusting impedance of an antenna with reference to the determined frequency band. Various embodiments of the present disclosure propose technology by which an electronic device determines a frequency band, performs impedance matching with reference to the determined frequency band, and transmits data by using an impedance-matched antenna. In an embodiment, the electronic device may determine the frequency band based on a rank. In another embodiment, the electronic device may determine the frequency band based on an amount of resources. In still another embodiment, the electronic device may determine the frequency band based on a channel quality. In yet another embodiment, the electronic device may determine the frequency band based on a service type. In further embodiment, the above-described frequency band determination methods may be equally applied to data transmission using an uplink. In still further embodiment, the above-described frequency band determination methods may be continuously performed.

Figure 2A:
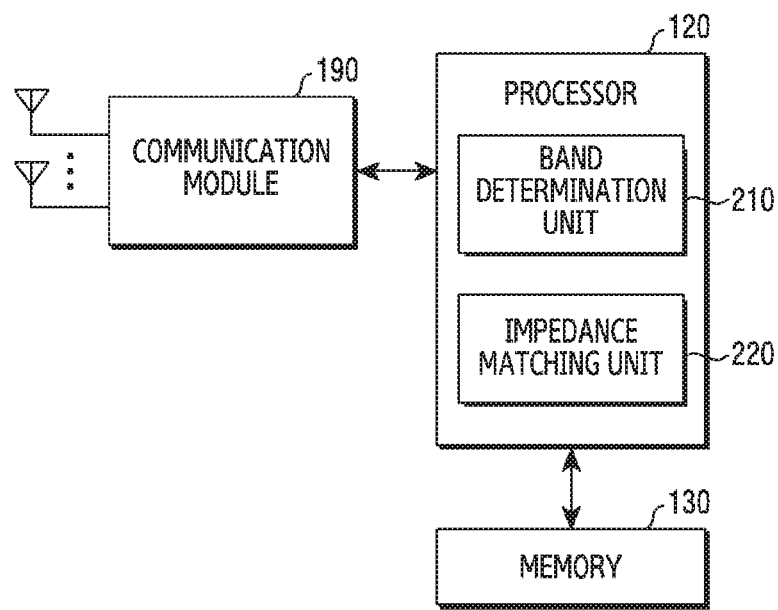
FIG. 2A is a block diagram illustrating an electronic device according to various embodiments of the present disclosure.

FIG. 2A is a block diagram illustrating an electronic device according to various embodiments of the present disclosure. For example, the electronic device may include an entirety or a part of the electronic device 101 illustrated in FIG. 1.

Referring to FIG. 2A, the electronic device 101 may include one or more processors 120 (for example, an AP), a memory 130, and a communication module 190. In various embodiments, the processor 120 may include a band determination unit 210 and an impedance matching unit 220. However, this should not be considered as limiting, and some of the elements may be omitted. According to an embodiment, the band determination unit 210 and the impedance matching unit 220 may be configured as modules configured as separate hardware or software installed outside the processor 120.

The band determination unit 210 may determine a frequency band necessary for performing impedance matching of an antenna. The impedance matching may be an operation of adjusting a reflection coefficient to minimize or reduce a reflection loss on a transmission line when connecting to a circuit between a signal source and a load to transmit data. For example, the reflection coefficient of voltage wave on the transmission line may indicate an amplitude ratio of voltage wave on a boundary having different impedance characteristics. As the reflection coefficient decreases, it may be determined that impedance matching is achieved, and, when the reflection coefficient is 0, there is no wave reflected on the transmission line, and thus it may be determined that impedance matching is completed. In various embodiments, impedance matching may be performed by using a pre-defined table. For example, the processor 120 may determine a frequency band to perform impedance matching, and may identify an impedance value corresponding to the determined frequency band and an impedance matching code (for example, an antenna impedance tuner (AIT) code) corresponding to the corresponding impedance, through the pre-defined table. The processor 120 may transmit the identified impedance matching code to the communication module 190, and the communication module 190 may perform impedance matching according to the impedance matching code. According to various embodiments, the pre-defined table for performing impedance matching may be stored in the memory 130. In various embodiments, the impedance matching unit 220 may apply a control signal for performing impedance matching to the communication module 190. The communication module 190 which receives the control signal may perform impedance matching of an antenna by using an impedance matching device. In various embodiments, the memory 130 may include a nonvolatile memory 134, and the nonvolatile memory 134 may store threshold information regarding a reference signal received poser (RSRP), a signal to interference-plus-noise ratio (SINR), an SNR, a modulation method, a bandwidth, a channel quality according a rank, or etc. However, the present disclosure is not limited thereto, and information stored in the nonvolatile memory 134 may be changed according to implementation.

In various embodiments, the band determination unit 210 included in the processor 120 may determine a frequency band, and the impedance matching unit 220 may generate a control signal for performing impedance matching with reference to the determined frequency band, and may transmit the generated control signal to the communication module 190. The communication module 190 which receives the control signal may perform impedance matching of the antenna by using the impedance matching device.

Figure 2B:
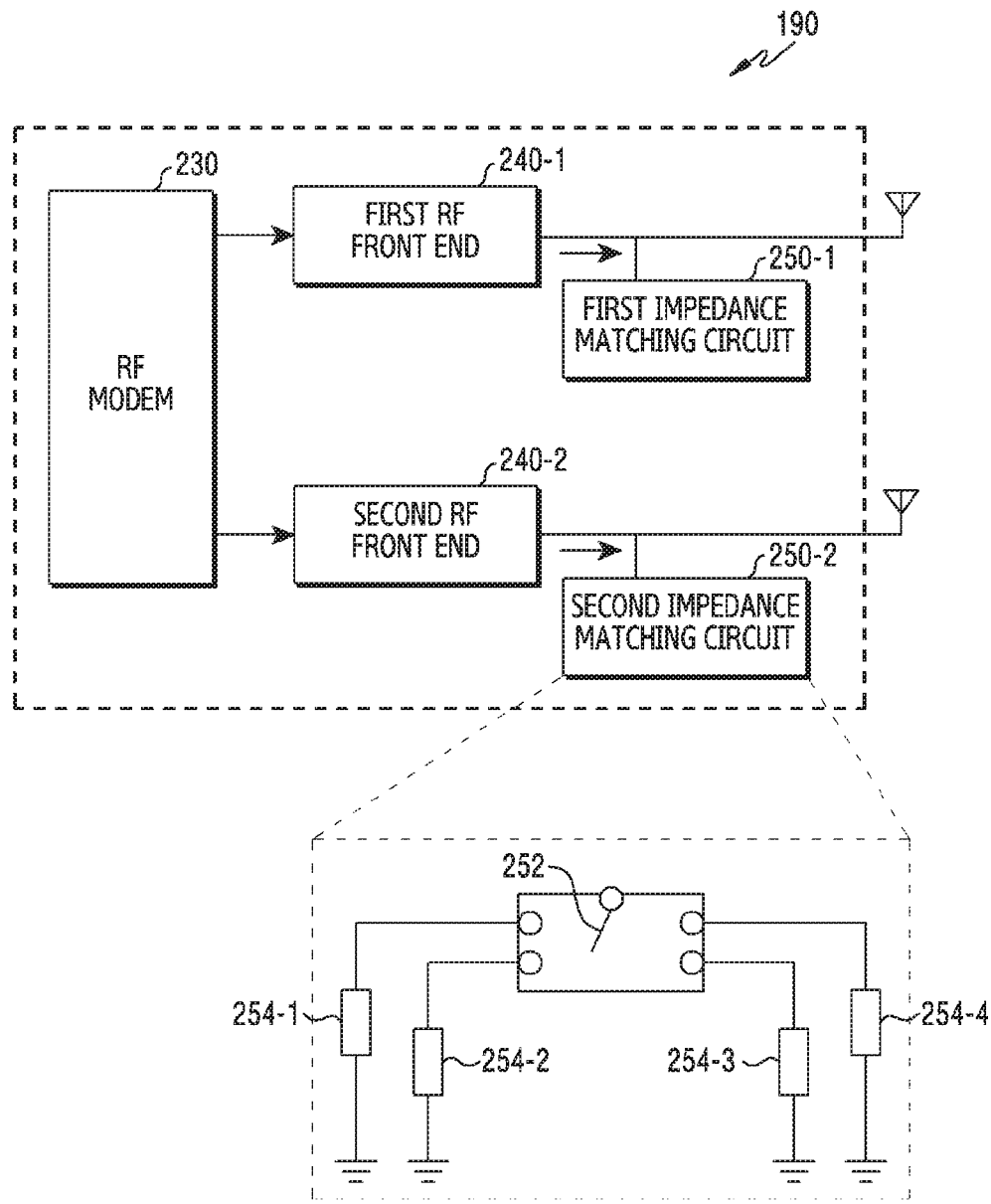
FIG. 2B is a block diagram illustrating a communication module according to various embodiments of the present disclosure.

FIG. 2B is a block diagram of a communication module according various embodiments of the present disclosure. For example, FIG. 2B illustrates a detailed configuration of the communication module 190 of FIG. 2A.

Referring to FIG. 2B, the communication module 190 may include one or more of an RF modem 230, a first RF front end 240-1, a second RF front end 240-2, a first impedance matching circuit 250-1, and a second impedance matching circuit 250-2. One or more RF front ends and one or more impedance matching circuits may exist, and FIG. 2B does not limit the features of the present disclosure.

In various embodiments, the second impedance matching circuit 250-2 may include a switch 252, a first electronic element 254-1, a second electronic element 254-2, a third electronic element 254-3, and a fourth electronic element 254-4. One or more switches and one or more electronic elements may exist in the impedance matching circuit, and FIG. 2B does not limit the features of the present disclosure.

In various embodiments, the first impedance matching circuit 250-1 may be connected to a line connecting the first RF front end 240-1 and an antenna with each other, and the second impedance matching circuit 250-2 may be connected to a line connecting the second RF front end 240-2 and an antenna with each other. In various embodiments, the first electronic element 254-1, the second electronic element 254-2, the third electronic element 254-3, and the fourth electronic element 254-4, which are included in the second impedance matching circuit 250-2, may be configured by an inductor, a capacitor or a combination thereof.

In an embodiment, the communication module 190 may receive a control signal for performing impedance matching from the impedance matching unit 220. The second impedance matching circuit 250-2 which receives the control signal may adjust a location of the switch 252 to connect any one of the first electronic element 254-1, the second electronic element 254-2, the third electronic element 254-3, and the fourth electronic element 254-4 with the antenna. Through this operation, the second impedance matching circuit 250-2 may perform impedance matching. In various embodiments, the first impedance matching circuit 250-1 and the second impedance matching circuit 250-2 may operate simultaneously or in sequence.

Figure 2C:
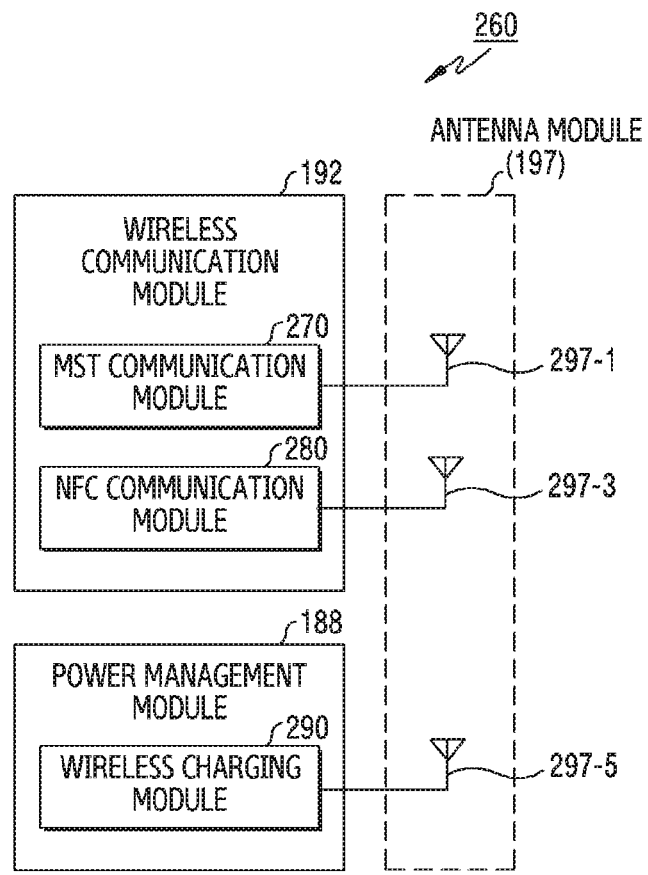
FIG. 2C is a block diagram illustrating a wireless communication module, a power management module, and an antenna module of an electronic device according to various embodiments of the present disclosure.

FIG. 2C is a block diagram 260 of the wireless communication module 192, the power management module 188, and the antenna module 197 of the electronic device 101 according to various embodiments of the present disclosure. Referring to FIG. 2C, the wireless communication module 192 may include an MST communication module 270 or an NFC communication module 280, and the power management module 188 may include a wireless charging module 290. In this case, the antenna module 197 may separately include a plurality of antennas including an MST antenna 297-1 connected with the MST communication module 270, an NFC antenna 297-3 connected with the NFC communication module 280, and a wireless charging antenna 297-5 connected with the wireless charging module 290. For convenience of explanation, the same elements as those of FIG. 1 will not be described or will be briefly described.

The MST communication module 270 may receive a signal (for example, a signal including control information or payment information) from the processor 120, may generate a magnetic signal corresponding to the received signal, and then may transmit the magnetic signal to the outside of the electronic device 101 (for example, a POS device) through the MST antenna 297-1. According to an embodiment, the MST communication module 270 may include a switching module (not shown) including one or more switches connected to the MST antenna 297-1, and may control the switching module to change a direction of a voltage or a current supplied to the MST antenna 297-1. The switching module may change a direction of the magnetic signal (for example, a magnetic field) which is transmitted through the MST antenna 297-1 and delivered to the outside of the electronic device 101 through short-range wireless communication 198. The magnetic signal transmitted with the direction being changed may have a similar form to that of a magnetic field generated by swiping a magnetic card by a card reader device of the electronic device 101, and may cause a similar effect to that of the magnetic field. According to an embodiment, payment information and a control signal received in the electronic device 101 in the form of the magnetic signal may be transmitted to a payment server (for example, the server 108) via the network 199, for example.

The NFC communication module 280 may obtain a signal (for example, a signal including control information or payment information) from the processor 120, and may transmit the obtained signal to the outside of the electronic device 101 through the NFC antenna 297-3. According to an embodiment, the NFC module 280 may receive a signal (for example, a signal including control information or payment information) transmitted from the outside of the electronic device 101 through the NFC antenna 297-3.

The wireless charging module 290 may wirelessly transmit power to the outside of the electronic device 101 (for example, a mobile phone or a wearable device) through the wireless charging antenna 297-5, or may wirelessly receive power from the outside of electronic device 101 (for example, a wireless charging device). The wireless charging module 290 may support various wireless charging methods including a magnetic resonance method or a magnetic induction method.

According to an embodiment, some of the MST antenna 297-1, the NFC antenna 297-3, or the wireless charging antenna 297-5 may share at least part of an emitter with one another. For example, an emitter of the MST antenna 297-1 may be used as an emitter of the NFC antenna 297-3 or the wireless charging antenna 297-5, and vice versa. When the MST antenna 297-1, the NFC antenna 297-3, or the wireless charging antenna 297-5 share at least part of the emitter with one another, the antenna module 197 may include a switching circuit (not shown) to selectively connect or disconnect (for example, open) at least part of the antennas 297-1, 297-3, or 297-5 under control of the wireless communication module 192 (for example, the MST communication module 270 or the NFC communication module 280) or the power management module (for example, the wireless charging module 290). For example, when the electronic device 101 uses a wireless charging function, the NFC communication module 280 or the wireless charging module 290 may control the switching circuit to disconnect at least part of the emitter shared by the NFC antenna 297-3 and the wireless charging antenna 297-5 from the NFC antenna 297-2 temporarily, and to connect the at least part of the emitter only to the wireless charging antenna 297-5.

According to an embodiment, at least some function of the MST communication module 270, the NFC communication module 280, or the wireless charging module 290 may be controlled by an external processor (for example, the processor 120). According to an embodiment, a designated function (or a payment function) of the MST communication module 270 or the NFC communication module 280 may be performed in a trusted execution environment (TEE). The TEE according to various embodiments refers to an execution environment in which at least some designated area of the memory 130 is allocated to perform a function requiring security of a relatively high level (for example, a function related to financial transactions or personal information), and an access to the designated area is restrictively allowed according to an accessing entity or an executed application.

In various embodiments, an electronic device comprising: a communication module; at least one processor; and a memory operatively connected with the processor, wherein, when being executed, the memory stores instructions that cause the at least one processor to: determine a frequency band based on information regarding at least one of a rank or a service, which is applied to frequency bands used for CA; perform impedance matching with reference to the frequency band; and transmit data by using antennas for which the impedance matching has been performed.

In various embodiments, wherein the instructions cause the at least one processor to determine at least one frequency band having a maximum rank as a reference band for the impedance matching.

In various embodiments, wherein the instructions cause the at least one processor to determine a frequency band having a widest bandwidth from among frequency bands having a maximum rank as a reference band for the impedance matching.

In various embodiments, wherein the instructions cause the at least one processor to identify an amount of resources of each frequency band, and to select a reference band for the impedance matching according to the amount of resources.

In various embodiments, wherein the amount of resources is in proportion to a product of a bandwidth and a rank of a frequency band.

In various embodiments, wherein the instructions cause the at least one processor to identify a frequency band providing a maximum gain, based on a channel quality and a rank in the respective frequency bands, and to select the identified frequency band as a reference band for the impedance matching.

In various embodiments, wherein the instructions cause the at least one processor to identify services provided through the respective frequency bands, and to determine a reference band for the impedance matching according to priorities of the services.

In various embodiments, wherein the priority is defined as being the highest for voice over LTE.

In various embodiments, the electronic device of claim 1, wherein the instructions cause the at least one processor to: determine whether CA is used; determine whether voice over LTE is used according to whether the CA is used; compare a rank of a frequency band of a Scell and a rank of a frequency band of a Pcell according to whether the voice over LTE is used; when the rank of the frequency band of the Scell is higher than the rank of the frequency band of the Pcell, measure a channel quality; when the measured channel quality is greater than or equal to a threshold, select the frequency band of the Scell, and, when the channel quality is smaller than the threshold, select the frequency band of the Pcell; and perform impedance matching with reference to the selected frequency band.

In various embodiments, an electronic device comprising: a plurality of antennas configured to transmit a signal; and a processor, wherein the processor is configured to: identify context information related to the signal of the electronic device; determine a frequency band based on the context information; perform impedance matching based on the frequency band; and transmit the signal by using at least one antenna for which the impedance matching has been performed.

In various embodiments, wherein the context information comprises at least one of a channel quality, a propagation environment between a base station and the electronic device, a rank, a layer, a codeword, an MCS, and an amount of resources.

Figure 3:
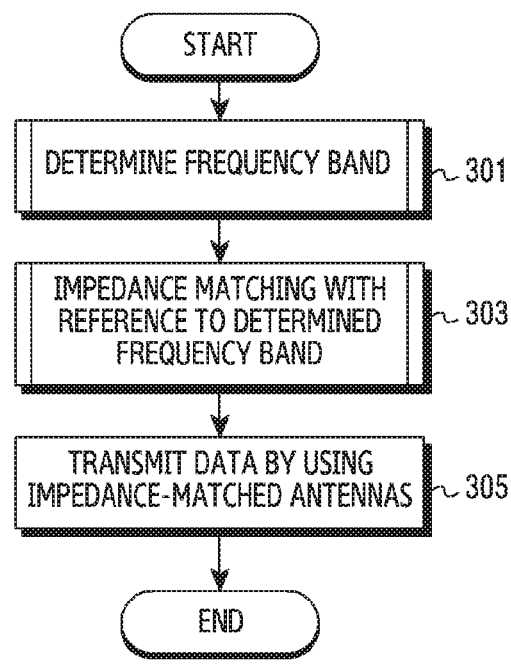
FIG. 3 is a flowchart of an electronic device according to various embodiments of the present disclosure.

FIG. 3 is a flowchart of an electronic device according to various embodiments of the present disclosure. In the following description, the electronic device may include an entirety or a part (for example, the processor 120) of the electronic device 101.

Referring to FIG. 3, in operation 301, the processor 120 may determine a frequency band.

According to an embodiment of the present disclosure, the electronic device may determine the frequency band by using a signal (radio wave) to be transmitted to the outside of the electronic device and a variety of context information related to the electronic device. The context information may include a rank. For example, the processor 120 may determine the frequency band based on the rank. The rank refers to the number of independent channels having a correlation less than or equal to a threshold in a channel environment using MIMO. For example, the rank of a frequency band supporting 4×4 MIMO may be 4, and the rank of a frequency band supporting 2×2 MIMO may be 2. In another example, when there are a first frequency band supporting 4×4 MIMO and a second frequency band supporting 2×2 MIMO, the processor 120 may identify the first frequency band as a frequency band having the maximum rank. In another example, the processor 120 may determine the frequency band based on an amount of resources. In an embodiment, the amount of resources may be a product of a rank and a bandwidth. For example, the amount of resources may be determined by a product of a rank and a bandwidth, by considering a rank, a layer, a codeword, and a modulation coding scheme (MCS) which are attributable to a propagation environment between a base station and an electronic device. In an embodiment, a transport block size (TBS) may be determined based on the rank and the amount of resources. In still another example, the processor 120 may determine the frequency band based on a channel quality (for example, a signal to noise ratio (SNR), a signal to interference plus noise ratio (SINR), a carrier to interference plus noise ratio (CINR), or etc.) In yet another example, the processor 120 may determine the frequency band based on a service type. In an embodiment, the service type may include voice over LTE, real-time streaming, web browsing, file forwarding, or etc.

In operation 303, the processor 120 may perform impedance matching with reference to the determined frequency band. For example, the processor 120 may perform impedance matching with reference to the determined frequency band to enhance performance in the determined frequency band. For example, the above-described performance may include maximization of data transmission traffic or enhancement of a quality of experience of a user. When impedance matching is performed, the processor 120 may transmit a control signal to the communication module 190. The communication module 190 may receive the control signal, and may perform impedance matching by using an impedance matching circuit.

In operation 305, the processor 120 may transmit data by using impedance-matched antennas. For example, the processor 120 may transmit data by using impedance-matched antennas in a MIMO environment using a plurality of antennas. The processor 120 may transmit data in the determined frequency band through impedance-matched antennas. In various embodiments, the processor 120 may maximize uplink or downlink performance by performing impedance matching for the antennas with reference to the determined frequency band.

Figure 4:
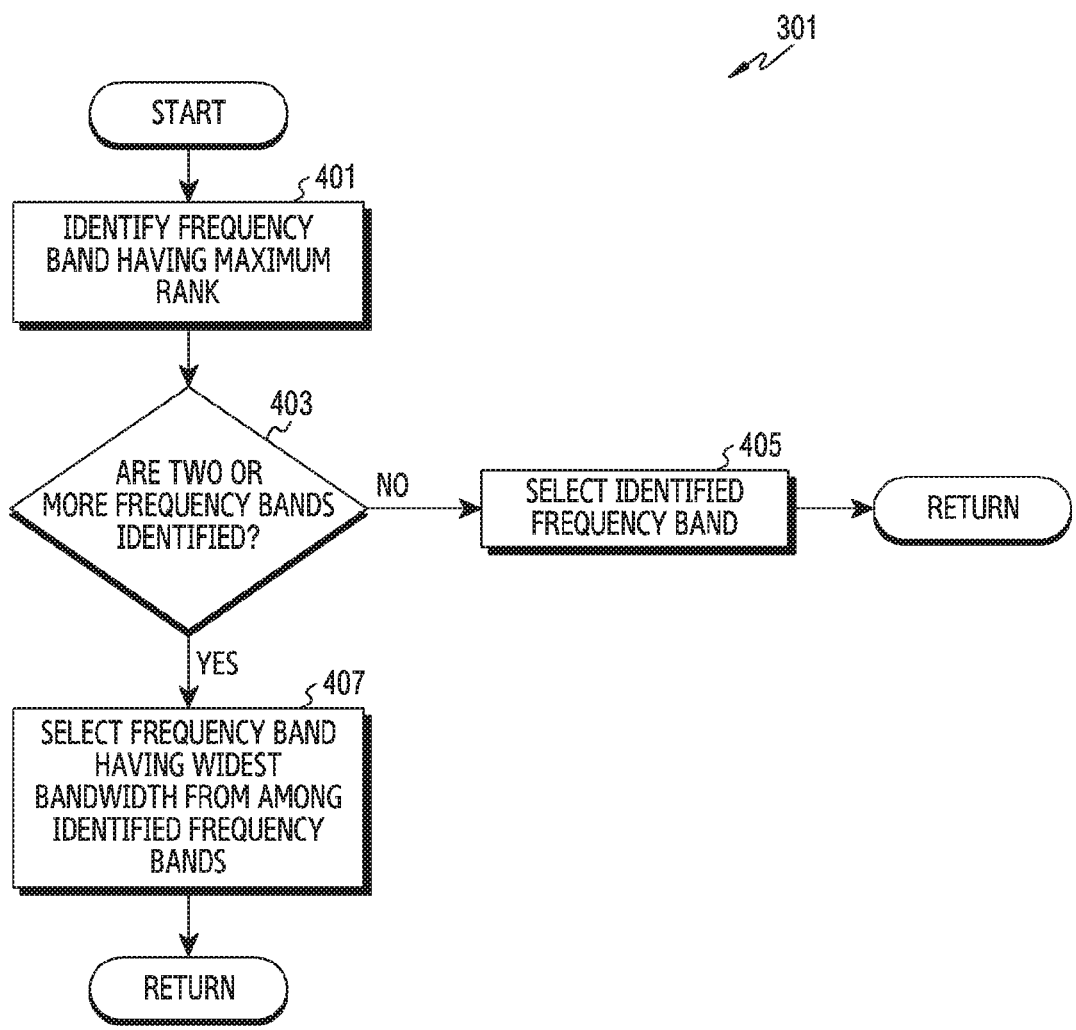
FIG. 4 is a flowchart for determining a frequency band based on a rank according to various embodiments of the present disclosure.

FIG. 4 is a flowchart for determining a frequency band based on a rank according to various embodiments of the present disclosure. The following description is related to operation 301 in FIG. 3 of determining the frequency band.

Referring to FIG. 4, in operation 401, the processor 120 may identify a frequency band having the maximum rank. In various embodiments, the rank refers to the number of independent channels having a correlation less than or equal to a threshold in a channel environment using MIMO. For example, the rank of a frequency band supporting 4×4 MIMO may be 4, and the rank of a frequency band supporting 2×2 MIMO may be 2. In another example, when there are a first frequency band supporting 4×4 MIMO and a second frequency band supporting 2×2 MIMO, the processor 120 may identify the first frequency band as a frequency band having the maximum rank.

In operation 403, the processor 120 may determine whether two or more frequency bands are identified. For example, in a 4-CA environment supporting four carrier components (CCs), a first frequency band may support 4×4 MIMO, a second frequency band may support 4×4 MIMO, a third frequency band may support 4×2 MIMO, and a fourth frequency band may support 2×2 MIMO. In various embodiments, the frequency band and the CC may have the same technical meaning. In this case, the first frequency band and the second frequency band may be identified as the frequency band having the maximum rank. When two or more frequency bands are not identified, the processor 120 may select the identified frequency band in operation 405. When two or more frequency bands are identified, the processor 120 may select a frequency band having the widest bandwidth from among the identified frequency bands in operation 407. Through the above-described operations, the processor 120 may determine the frequency band which is a reference for performing impedance matching by using the rank.

Figure 5:
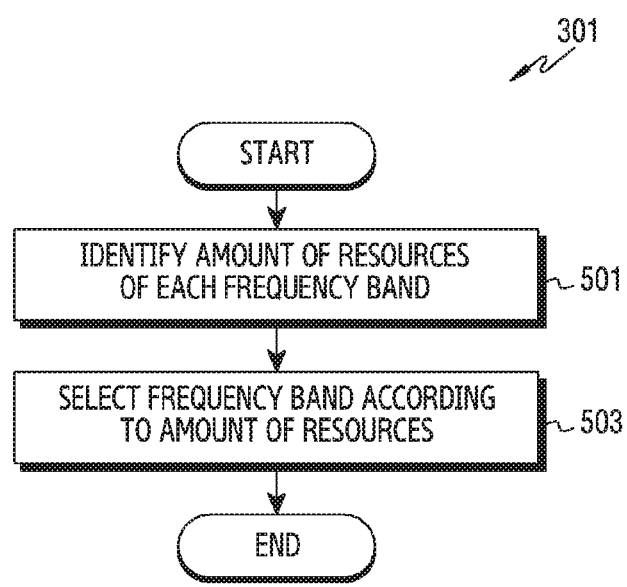
FIG. 5 is a flowchart for determining a frequency band based on an amount of resources according to various embodiments of the present disclosure.

FIG. 5 is a flowchart for determining a frequency band based on an amount of resources according to various embodiments of the present disclosure. The following description is related to operation 301 in FIG. 3 of determining the frequency band.

Referring to FIG. 5, in operation 501, the processor 120 may identify an amount of resources for each frequency band. In various embodiments, the amount of resources may be a product of a rank of a frequency band and a bandwidth. For example, when a bandwidth of a frequency band supporting 4×4 MIMO is 10 MHz, the amount of resources of the frequency band is 40.

In operation 503, the processor 120 may select a frequency band according to the amount of resources. For example, in a 4-CA environment supporting four CCs, a bandwidth of a first frequency band supporting 2×2 MIMO may be 10 MHz, a band width of a second frequency band supporting 2×2 MIMO may be 10 MHz, a band width of a third frequency band supporting 4×4 MIMO may be 20 MHz, and a band width of a fourth frequency band supporting 4×2 MIMO may be 20 MHz. In this case, the processor 120 may identify the third frequency band as a frequency band having the maximum amount of resources, and may select the third frequency band. In various embodiments, when there are a plurality of frequency bands having the same amount of resources, the processor 120 may select one frequency band from the plurality of frequency bands according to a predetermined condition. For example, the predetermined condition may be identifiers (IDs) of the frequency bands and the presence/absence of a frequency band of a Pcell.

Figure 6:
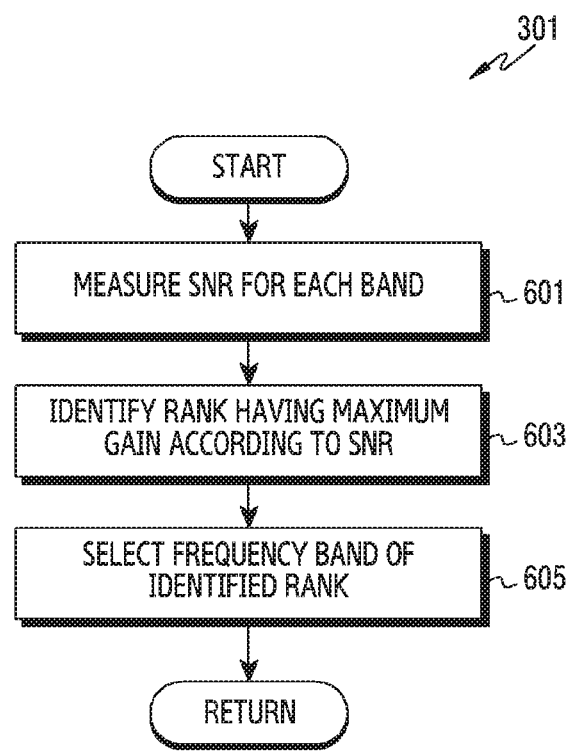
FIG. 6 is a flowchart for determining a frequency band based on a channel quality according to various embodiments of the present disclosure.

FIG. 6 is a flowchart for determining a frequency band by using an SNR according to various embodiments of the present disclosure. The following description is related to operation 301 in FIG. 3 of determining the frequency band. In the following description, the SNR is an example of a channel quality, but the present disclosure is not limited thereto.

The operations which will be described below may be performed on the assumption that the amount of resources is theoretically the same for every rank of the frequency bands. For example, when a bandwidth of a first frequency band supporting 4×4 MIMO is 10 MHz, and a bandwidth of a second frequency band supporting 2×2 MIMO is 20 MHz, the first frequency band and the second frequency band have the same amount of resources, 40.

Referring to FIG. 6, in operation 601, the processor 120 may measure an SNR for each band. For example, the processor 120 may measure an SNR of a signal transmitted through the first frequency band supporting 4×4 MIMO and the second frequency band supporting 2×2 MIMO. The target to be measured by the processor 120 is not limited to the SNR.

In operation 603, the processor 120 may identify a rank having the maximum gain according to the SNR. In various embodiments, gains of 4×4 MIMO and 2×2 MIMO according to SNRs are shown in table 1 presented below:

TABLE 1

| SNR | 4 × 4 MIMO 256QAM | 2 × 2 MIMO 256QAM | gain and loss |
|---|---|---|---|
| 10 | 0 | 0 | |
| 11 | 0 | 0 | |
| 12 | 0 | 0 | |
| 13 | 0 | 0 | |
| 14 | 0 | 0 | |
| 15 | 0 | 0 | |
| 16 | 0 | 21.85607 | −100% |
| 17 | 0 | 1376.932 | −100% |
| 18 | 0 | 3475.114 | −100% |
| 19 | 0 | 11889.7 | −100% |
| 20 | 0 | 22205.76 | −100% |
| 21 | 0 | 37024.18 | −100% |
| 22 | 88.07128 | 57284.75 | −99.85% |
| 23 | 3390.744 | 72496.57 | −95.32% |
| 24 | 15016.15 | 84757.82 | −82.28% |
| 25 | 50332.74 | 92931.99 | −45.84% |
| 26 | 90790.34 | 99568.5 | −2.79% |
| 27 | 145273.6 | 107309.3 | 35.38% |
| 28 | 181911.2 | 114684.5 | 58.62% |
| 29 | 200626.4 | 120645.3 | 66.29% |
| 30 | 216881.9 | 126936.7 | 70.86% |
| 31 | 235554.5 | 132281.4 | 78.07% |
| 32 | 252166.2 | 134518 | 87.46% |

TABLE 1-continued

| SNR | 4 × 4 MIMO 256QAM | 2 × 2 MIMO 256QAM | gain and loss |
|---|---|---|---|
| 33 | 265239.3 | 143556.2 | 84.76% |
| 34 | 270352.4 | 151171.8 | 78.84% |

Referring to table 1, gains of 4×4 MIMO and 2×2 MIMO and gains and losses of 4×4 MIMO compared with 2×2 MIMO may vary according to SNRs. For example, when the SNR is 22, the gain of 4×4 MIMO may be lower than the gain of 2×2 MIMO, and the processor 120 may identify 2×2 MIMO as a rank having the maximum gain. In another example, when the SNR is 28, the gain of 4×4 MIMO may be higher than the gain of 2×2 MIMO, and the processor 120 may identify 4×4 MIMO as a rank having the maximum gain. In an embodiment having data as shown in table 1, the SNR value of 27 may be a threshold. When the SNR is smaller than 27, 2×2 MIMO may be the rank having the maximum gain, and, when the SNR is larger than or equal to 27, 4×4 MIMO may be the rank having the maximum gain. Data indicating values of gains of each rank according to SNRs as shown in table 1 may be stored in the nonvolatile memory 134 included in the memory 130 of the electronic device 101.

In operation 605, the processor 120 may select a frequency bank of the identified rank. For example, when 4×4 MIMO is identified as the rank having the maximum gain, the processor 120 may select a frequency band supporting 4×4 MIMO. Through the above-described operations, the processor 120 may determine the frequency band which is a reference for performing impedance matching by using the SNR.

Figure 7:
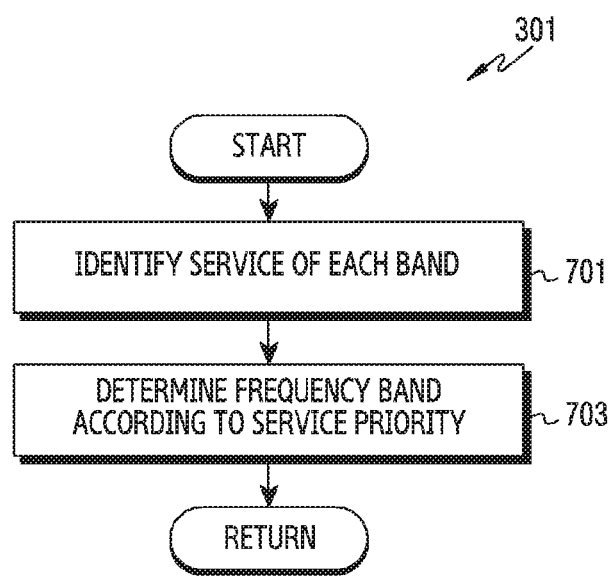
FIG. 7 is a flowchart for determining a frequency band based on a service type according to various embodiments of the present disclosure.

FIG. 7 is a flowchart for determining a frequency band based on a service type according to various embodiments of the present disclosure. The following description is related to operation 301 in FIG. 3 of determining the frequency band.

Referring to FIG. 7, in operation 701, the processor 120 may identify a service for each band. For example, the processor 120 may identify services (for example, voice over LTE, real-time streaming, web browsing, file forwarding, or etc.) provided in each frequency band.

In operation 703, the processor 120 may determine a frequency band according to a service priority. The service priority may be differently defined according to various embodiments. According to an embodiment, a highest priority may be assigned to the voice over LTE service. Since the voice over LTE has the highest service priority, both transmission performance and reception performance may be importantly considered. The processor 120 may determine a frequency band used by the voice over LTE having the highest service priority as a reference frequency band for impedance matching, regardless of a rank or an amount of resources. In another embodiment, the highest priority may be assigned to the real-time streaming service. Through the above-described operations, the processor 120 may determine the reference frequency band for impedance matching by using the service type.

Figure 8:
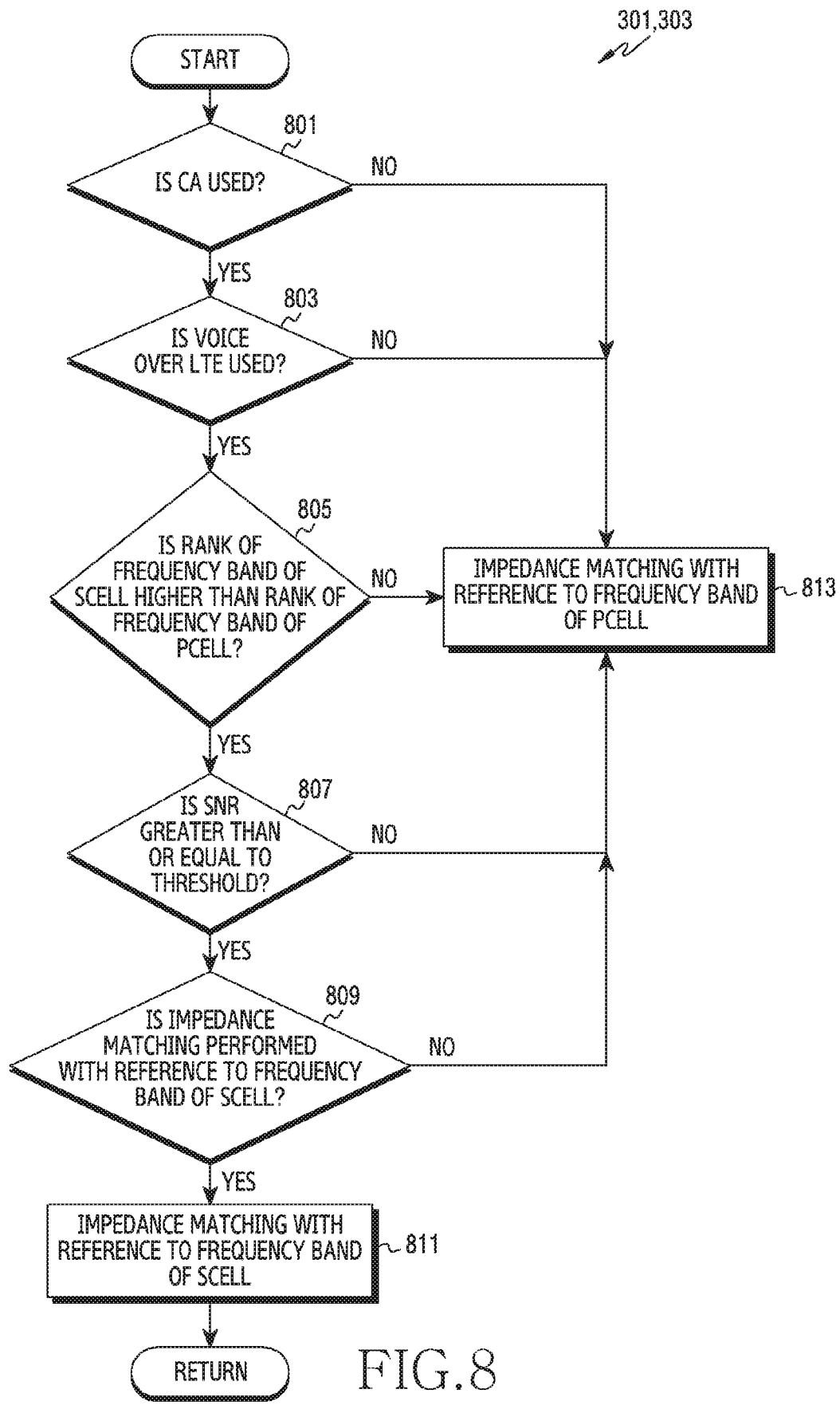
FIG. 8 is a flowchart for determining a frequency band and performing impedance matching according to various embodiments of the present disclosure.

FIG. 8 is a flowchart for determining a frequency band and performing impedance matching according to various embodiments of the present disclosure. The following description is related to operation 301 in FIG. 3 of determining the frequency band and operation 303 of impedance-matching with reference to the frequency band determined in operation 301.

Referring to FIG. 8, the processor 120 may determine whether the electronic device 101 uses CA in operation 801. When the electronic device 101 does not use CA, the processor 120 may perform impedance matching with reference to a frequency band of a Pcell in operation 813. When the electronic device 101 uses CA, the processor 120 may perform operation 803.

In operation 803, the processor 120 may determine whether the electronic device 101 uses voice over LTE. In various embodiments, operation 803 is not limited to the voice over LTE, and may be replaced with an operation of identifying various service types having a high priority. When the electronic device 101 does not use voice over LTE, the processor 120 may perform impedance matching with reference to the frequency band of the Pcell in operation 813. When the electronic device uses voice over LTE, the processor 120 may perform operation 805.

In operation 805, the processor 120 may determine whether the rank of a frequency band of an Scell is higher than the rank of the frequency band of the Pcell. For example, when the rank of the frequency band of the Pcell is 2×2 MIMO, and the rank of the frequency band of the Scell is 4×4 MIMO, the rank of the frequency band of the Scell may be higher than the rank of the frequency band of the Pcell. When the rank of the frequency band of the Scell is not higher than the rank of the frequency band of the Pcell, the processor 120 may perform impedance matching with reference to the frequency band of the Pcell in operation 813. When the rank of the frequency band of the Scell is higher than or equal to the rank of the frequency band of the Pcell, the processor 120 may perform operation 807.

In operation 807, the processor 120 may determine whether an SNR is greater than or equal to a threshold. For example, in a wireless communication environment including a first frequency band supporting 4×4 MIMO, and a second frequency band supporting 2×2 MIMO, the threshold of the SNR may be 27. When the SNR is smaller than 27, 2×2 MIMO may be the rank having the maximum gain, and, when the SNR is greater than or equal to 27, 4×4 MIMO may be the rank having the maximum gain. When the SNR is smaller than the threshold, the processor 120 may perform impedance matching with reference to the frequency band of the Pcell in operation 813. When the SNR is greater than or equal to the threshold, the processor 120 may perform operation 809.

In operation 809, the processor 120 may determine whether to perform impedance matching with reference to the frequency band of the Scell. When impedance matching is not performed with reference to the frequency band of the Scell, the processor 120 may perform impedance matching with reference to the frequency band of the Pcell in operation 813. For example, when the frequency band of the Pcell supports 4×4 MIMO and the frequency band of the Scell support 4×4 MIMO, the processor 120 may perform impedance matching with reference to the frequency band of the Pcell. When impedance matching is performed with reference to the frequency band of the Scell, the processor 120 may perform operation 811.

In operation 811, the processor 120 may perform impedance matching with reference to the frequency band of the Scell. For example, when the frequency band of the Pcell supports 2×2 MIMO and the frequency band of at least one Scell supports 4×4 MIMO, the processor 120 may perform impedance matching with reference to the frequency band of the Scell.

Figure 9:
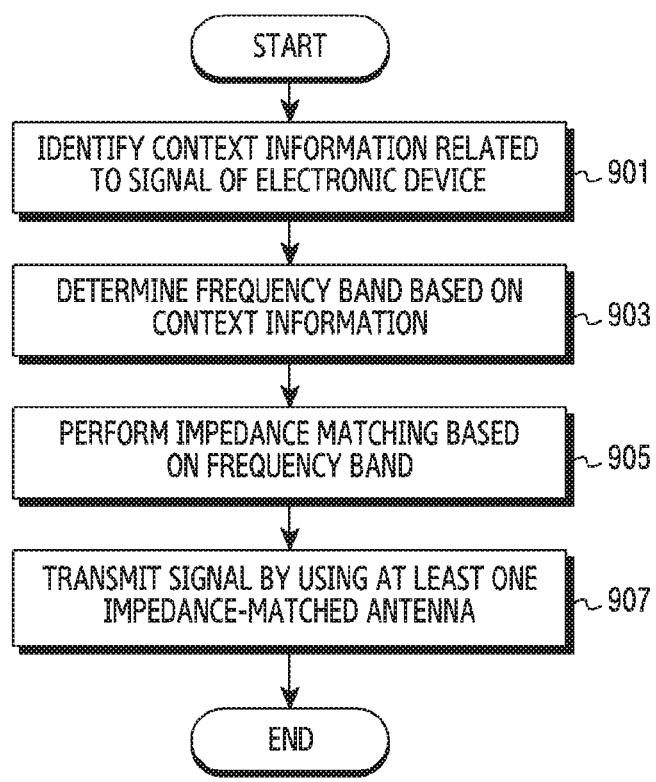
FIG. 9 is a flowchart of an electronic device according to various embodiments of the present disclosure.

FIG. 9 is a flowchart of an electronic device according to various embodiments of the present disclosure. In the following description, the electronic device may include an entirety or a part (for example, the processor 120) of the electronic device 101 of FIG. 1.

Referring to FIG. 9, in operation 901, the processor 120 may identify context information related to a signal of the electronic device 101. For example, the context information may include a channel quality, a propagation environment between a base station and the electronic device 101, a rank, a layer, a codeword, an MCS, and an amount of resources.

In operation 903, the processor 120 may determine a frequency band based on the context information. In an embodiment, the processor 120 may determine the frequency band based on a rank. In another embodiment, the processor 120 may determine the frequency band based on an amount of resources. In still another embodiment, the processor 120 may determine the frequency band based on a channel quality. In yet another embodiment, the processor 120 may determine the frequency band based on a service type. In further embodiment, the above-described frequency band determination methods may be equally applied to data transmission using an uplink. In still further embodiment, the above-described frequency band determination methods may be continuously performed.

In operation 905, the processor 120 may perform impedance matching based on the frequency band. For example, the processor 120 may perform impedance matching with reference to the determined frequency band to enhance performance in the determined frequency band. For example, the above-described performance may include maximization of data transmission traffic or enhancement of a quality of experience of a user. When impedance matching is performed, the processor 120 may transmit a control signal to the communication module 190. The communication module 190 may receive the control signal and may perform impedance matching by using an impedance matching circuit.

In operation 907, the processor 120 may transmit a signal by using at least one impedance-matched antenna. For example, in a MIMO environment using a plurality of antennas, the processor 120 may transmit a signal by using at least one impedance-matched antenna. The processor 120 may transmit a signal in the determined band through the at least one impedance-matched antenna. In various embodiments, the processor 120 may maximize downlink or uplink performance by performing impedance matching for the antenna with reference to the determined frequency band.

In various embodiments, an operating method of an electronic device, the operating method comprising: determining a frequency band based on information regarding at least one of a rank or a service, which is applied to frequency bands used for CA; performing impedance matching with reference to the frequency band; and transmitting data by using antennas for which the impedance matching has been performed.

In various embodiments, wherein determining the frequency band comprises determining at least one frequency band having a maximum rank as a reference band for the impedance matching.

In various embodiments, wherein determining the frequency band comprises determining a frequency band having a widest bandwidth from among frequency bands having a maximum rank as a reference band for the impedance matching.

In various embodiments, wherein determining the frequency band comprises identifying an amount of resources of each frequency band, and selecting a reference band for the impedance matching according to the amount of resources, wherein the amount of resources is in proportion to a product of a bandwidth and a rank of a frequency band.

In various embodiments, wherein determining the frequency band comprises: identifying a frequency band providing a maximum gain, based on a channel quality and a rank in the respective frequency bands; and selecting the identified frequency band as a reference band for the impedance matching.

In various embodiments, wherein determining the frequency band comprises: identifying services provided through the respective frequency bands; and determining a reference band for the impedance matching according to priorities of the services.

In various embodiments, wherein the priority is defined as being the highest for voice.

In various embodiments, wherein determining the frequency band comprises: determining whether CA is used; determining whether voice over LTE is used according to whether the CA is used; comparing a rank of a frequency band of a Scell and a rank of a frequency band of a Pcell according to whether the voice over LTE is used; when the rank of the frequency band of the Scell is higher than the rank of the frequency band of the Pcell, measuring a channel quality; and when the measured channel quality is greater than or equal to a threshold, selecting the frequency band of the Scell, and, when the channel quality is smaller than the threshold, selecting the frequency band of the Pcell, wherein performing the impedance matching comprises performing impedance matching with reference to the selected frequency band.

In various embodiments, the operation method of the electronic device includes: checking context information related to the signal of the electronic device, determining a frequency band based on the context information, performing impedance matching based on the frequency band, and the impedance may include the step of majoring in the signal using at least one antenna that has been matched.

In various embodiments, the context information may include at least one of a channel quality, a radio wave environment between a base station and the electronic device, a rank, a layer, a codeword, a modulation coding scheme (MCS), and a resource amount.

As described above, the electronic device and the operating method thereof according to various embodiments may determine a frequency band by considering a rank, an amount of resources, an SNR, and a service type, and may maximize downlink or uplink performance by performing impedance matching for an antenna with reference to the determined frequency band.

The term "module" used herein may include a unit including hardware, software, or firmware, and, for example, may be interchangeably used with the terms "logic," "logical block," "component" or "circuit". The "module" may be an integrally configured component or a minimum unit for performing one or more functions or a part thereof. The "module" may be implemented mechanically or electronically. For example, the "module" may include an application-specific IC (ASIC) chip, a field-programmable gate array (FPGA), and a programmable-logic device for performing some operations, which are known or will be developed.

At least part of a device (for example, modules or functions thereof) or a method (for example, operations) according to various embodiments, for example, may be implemented by instructions stored in a computer-readable storage media (for example, the memory 130) in the form of a programmable module. When the instruction is executed by a processor (for example, the processor 120), the processor may perform a function corresponding to the instruction. A computer-readable recording medium may include a hard disk, a floppy disk, a magnetic media (for example, a magnetic tape), an optical recording media (for example, compact disc read only memory (CD-ROM) and a digital versatile disc (DVD), a magneto-optical media (for example, a floptical disk)), an internal memory, or the like. Also, an instruction may include a code generated by a compiler or a code executable by an interpreter. A module or a program module according to various embodiments may include at least one of the above-described elements, or a portion of the above-described elements may be omitted, or additional other elements may be further included.

Operations performed by a module, a program module, or other elements according to various embodiments may be executed sequentially, in parallel, repeatedly, or in a heuristic method. Also, at least part of operations may be executed in different sequences, omitted, or other operations may be added.

The present disclosure has been described with reference to various example embodiments thereof. It will be understood by a person skilled in the art that the present disclosure can be implemented in modified forms without departing from the essential characteristics of the present disclosure. Therefore, disclosed embodiments should be considered from a descriptive perspective, not from a limited perspective. The scope of the present disclosure is defined not by the detailed description but by the appended claims, and all differences within the scope should be understood as being included in the present disclosure.

What is claimed is:

1. An electronic device comprising:
a communication module;
at least one processor; and
a memory operatively connected with the processor,
wherein, when being executed, the memory stores instructions that cause the at least one processor to:
determine a first frequency band having maximum rank as a first reference band for impedance matching;
perform the impedance matching with reference to the first frequency band; and
transmit data by using antennas for which the impedance matching has been performed.

2. The electronic device of claim 1, wherein the instructions cause the at least one processor to:
determine whether carrier aggregation (CA) is used;
determine whether voice over LTE is used according to whether the CA is used;
compare a rank of a frequency band of a secondary cell (Scell) and a rank of a frequency band of a primary cell (Pcell) according to whether the voice over LTE is used;
when the rank of the frequency band of the Scell is higher than the rank of the frequency band of the Pcell, measure a channel quality;
when the measured channel quality is greater than or equal to a threshold, select the frequency band of the Scell, and, when the channel quality is smaller than the threshold, select the frequency band of the Pcell; and
perform impedance matching with reference to the selected frequency band.

3. The electronic device of claim 1, wherein, if the determined first frequency band has two or more frequency bands, the instructions cause the at least one processor to determine a second frequency band having a widest bandwidth from among the first frequency band as the first reference band for the impedance matching.

4. The electronic device of claim 1, wherein the instructions further cause the at least one processor to identify an amount of resources of each frequency band, and to select a second reference band for the impedance matching according to the amount of resources.

5. The electronic device of claim 4, wherein the amount of resources is in proportion to a product of a bandwidth and a rank of a frequency band.

6. The electronic device of claim 1, wherein the instructions further cause the at least one processor to identify a second frequency band providing a maximum gain, based on a channel quality and a rank in the respective frequency bands, and to select the identified second frequency band as a second reference band for the impedance matching.

7. The electronic device of claim 1, wherein the instructions further cause the at least one processor to identify services provided through the respective frequency bands, and to determine a second reference band for the impedance matching according to priorities of the services.

8. The electronic device of claim 7, wherein the priority is defined as being the highest for voice over long term evolution (LTE).

9. An electronic device comprising:
a plurality of antennas configured to transmit a signal; and
a processor,
wherein the processor is configured to:
identify context information related to the signal of the electronic device;
determine a frequency band based on the context information, wherein the context information comprises at least one of a channel quality, a propagation environment between a base station and the electronic device, a layer, a codeword, a modulation coding scheme (MCS), and an amount of resources;
perform impedance matching based on the frequency band; and
transmit the signal by using at least one antenna for which the impedance matching has been performed.

10. An operating method of an electronic device, the operating method comprising:
determining a first frequency band having maximum rank as a first reference band for impedance matching;
performing the impedance matching with reference to the first frequency band; and
transmitting data by using antennas for which the impedance matching has been performed.

11. The operating method of claim 10, wherein the operating method further comprises:
determining whether carrier aggregation (CA) is used;
determining whether voice over long term evolution (LTE) is used according to whether the CA is used;
comparing a rank of a frequency band of a secondary cell (Scell) and a rank of a frequency band of a primary cell (Pcell) according to whether the voice over LTE is used;
when the rank of the frequency band of the Scell is higher than the rank of the frequency band of the Pcell, measuring a channel quality; and
when the measured channel quality is greater than or equal to a threshold, selecting the frequency band of the Scell, and, when the channel quality is smaller than the threshold, selecting the frequency band of the Pcell,
wherein performing the impedance matching comprises performing impedance matching with reference to the selected frequency band.

12. The operating method of claim 10, wherein the operating method further comprises:
identifying services provided through the respective frequency bands; and
determining a second reference band for the impedance matching according to priorities of the services.

13. The operating method of claim 12, wherein the priority is defined as being the highest for voice over long term evolution (LTE).

14. The operating method of claim 10, wherein the operating method further comprises:
   if the determined first frequency band has two or more frequency bands, determining a second frequency band having a widest bandwidth from among the first frequency band as the first reference band for the impedance matching.

15. The operating method of claim 10, wherein the operating method further comprises:
   identifying an amount of resources of each frequency band, and selecting a second reference band for the impedance matching according to the amount of resources.

16. The operating method of claim 15, wherein the amount of resources is in proportion to a product of a bandwidth and a rank of a frequency band.

17. The operating method of claim 10, wherein the operating method further comprises:
   identifying a second frequency band providing a maximum gain, based on a channel quality and a rank in the respective frequency bands; and
   selecting the identified second frequency band as a second reference band for the impedance matching.

\* \* \* \* \*